Jan. 13, 1931.  B. D. HORTON  1,788,624
METER ADAPTER
Original Filed May 22, 1915

INVENTOR
Byron D Horton
By Clifford E. Dunn
ATTORNEY

Patented Jan. 13, 1931

1,788,624

UNITED STATES PATENT OFFICE

BRYSON D. HORTON, OF DETROIT, MICHIGAN, ASSIGNOR TO SQUARE D COMPANY, OF DETROIT, MICHIGAN, A CORPORATION OF MICHIGAN

METER ADAPTER

Original application filed May 22, 1915, Serial No. 29,738. Divided and this application filed February 15, 1919, Serial No. 277,193. Renewed December 11, 1926.

It is desirable to make an electrical installation iron clad throughout in order to improve the safety factor and keep unauthorized persons from access to the conducting parts. Many installations include a service box and an electric meter for measuring the energy by the service company. It is an object of my invention to provide adapters to accommodate the various sizes and shapes of meters which are on the market and in use by the service companies and to shield the wires between the meters and service boxes of different sizes.

This application is a division of my co-pending application 29,738 for Metal boxes or receptacles for electrical switches, filed May 22, 1915.

Figure 1:
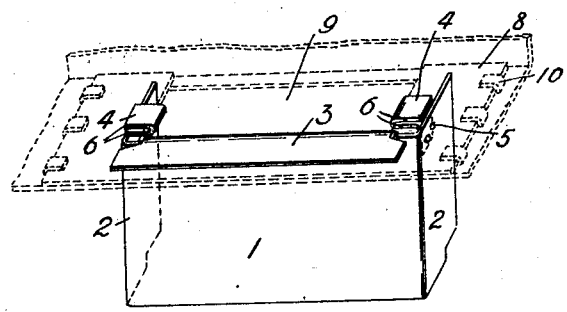
Figure 2:
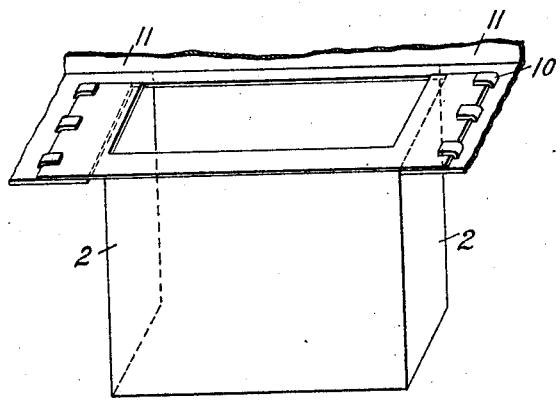
Figure 3:
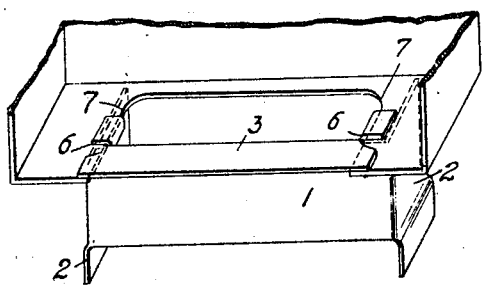

In the accompanying drawings, I have shown in Figures 1, 2 and 3, three commercial forms in which my invention may find embodiment, each associated in a different way with the wall of a service box.

Referring to the drawings, similar characters present corresponding parts throughout the several views.

In each case, my meter adapter is made up from sheet metal and comprises a front or top 1 having at either side thereof depending sides 2. In the form shown in Figs. 1 and 3, the metal near the upper edge of the front or top 1 is bent at right angles to form an engaging face 3. At the upper end of the sides 2, I provide a pair of angularly projecting hooks 4—4 which may be either integral with the metal of the adapter or riveted thereto, as shown at 5. In the form there shown, each of these hooks comprises two parallel side walls 6—6 which provide a jaw. The upper walls 6—6 are each in substantially the same plane as the face 3.

Adapters of this form may be retained alongside the wall of the service box either by sliding the adapter alongside the edges 7—7 of an open slot in the wall of the box, as shown in Fig. 3, or by the use of an adapter plate 8 shown in dotted lines in Fig. 1. When such an adapter plate is used, it may be retained alongside an opening 9 in the wall of the box by tangs or projections 10. To remove the adapter, it is merely necessary to slide outwardly the plate 8 whereupon the meter adapter will pass downwardly as in Fig. 1.

In the form of adapter shown in Fig. 2, the metal has been bent outwardly to form broad engaging portions 11 which are adapted to engage tangs 10, as does the adapter plate 8. This form of an adapter is, however, particularly adapted for use in a casing wall having an open slot, as shown in Fig. 2. It is therefore apparent that I have provided adapters which are easily constructed and which may be readily used with varying kinds of service boxes and with the various shapes of meters. The adapters are securely held next the box by means of the outwardly bent portions which present an engaging surface for the flat walls of the casing or the adapter plate, as the case may be.

While my invention may take form in many other embodiments, I consider that the representation of these three forms is sufficient to show the adaptability of the device.

I claim:

A meter adapter comprising, a sheet metal member having connected sides and a top forming a housing for the wires between a switch box and meter, the ends of the sides at the box-engaging end of the adapter being bent angularly toward each other and provided on the ends thereof with angularly projecting hooks for engagement with the switch box and the top of the adapter at the box-engaging end thereof having an angularly up-standing flange.

BRYSON D. HORTON.